200 — 700
$\lambda\,(m\mu)$

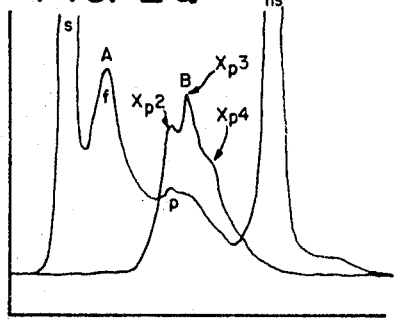
FIG. 2a (B. SUBTILIS)
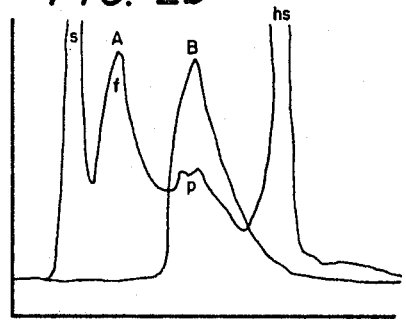
FIG. 2b (S. EPIDERMIDIS)
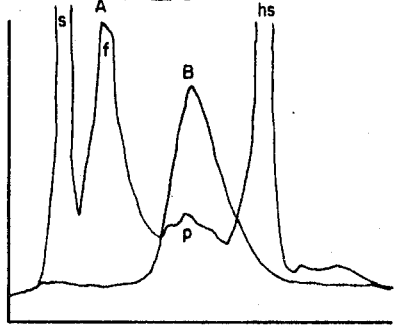
FIG. 2c (N. MENINGITIDES L-1)
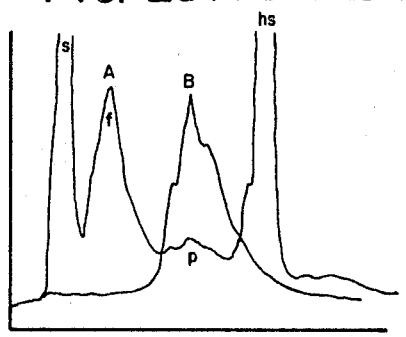
FIG. 2d (N. MENINGITIDES 1027 A)

200 — 700
$\lambda\,(m\mu)$

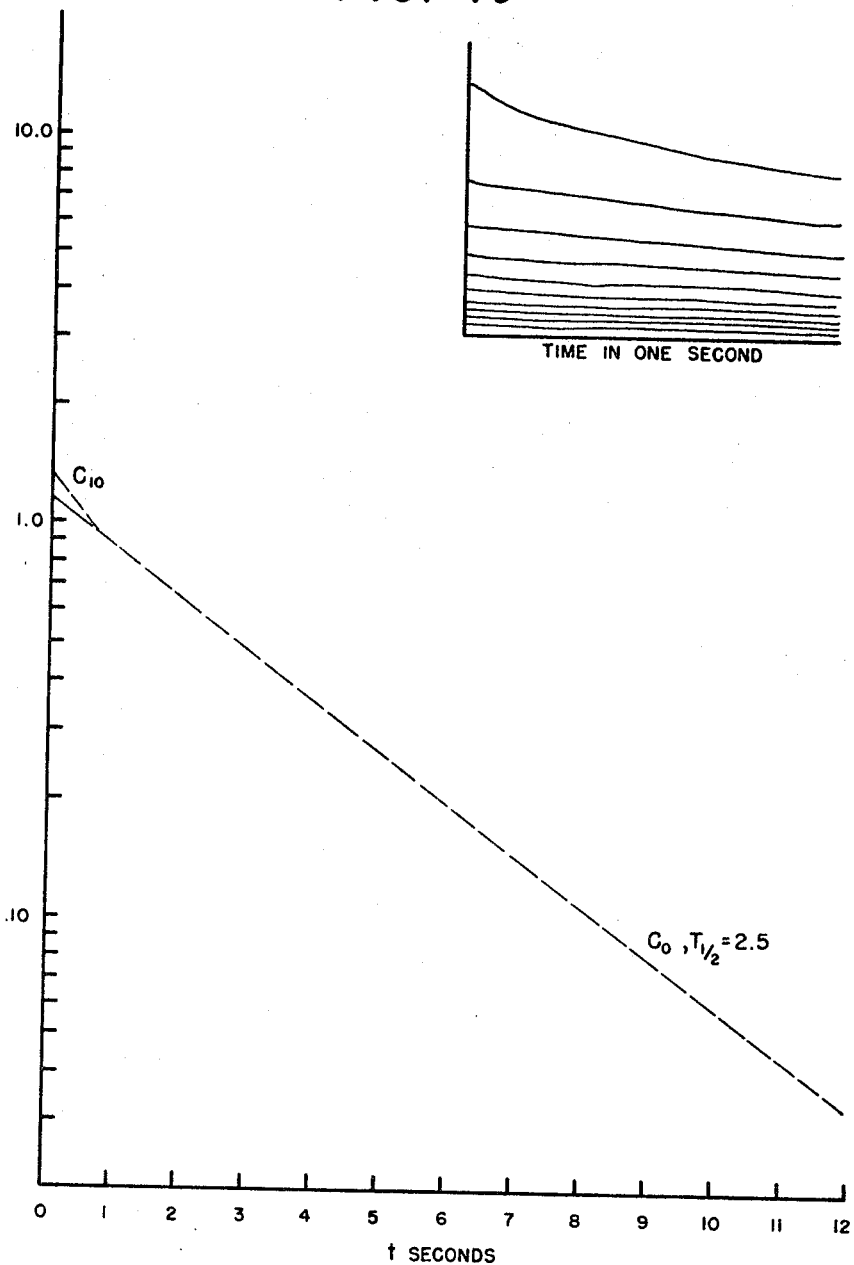

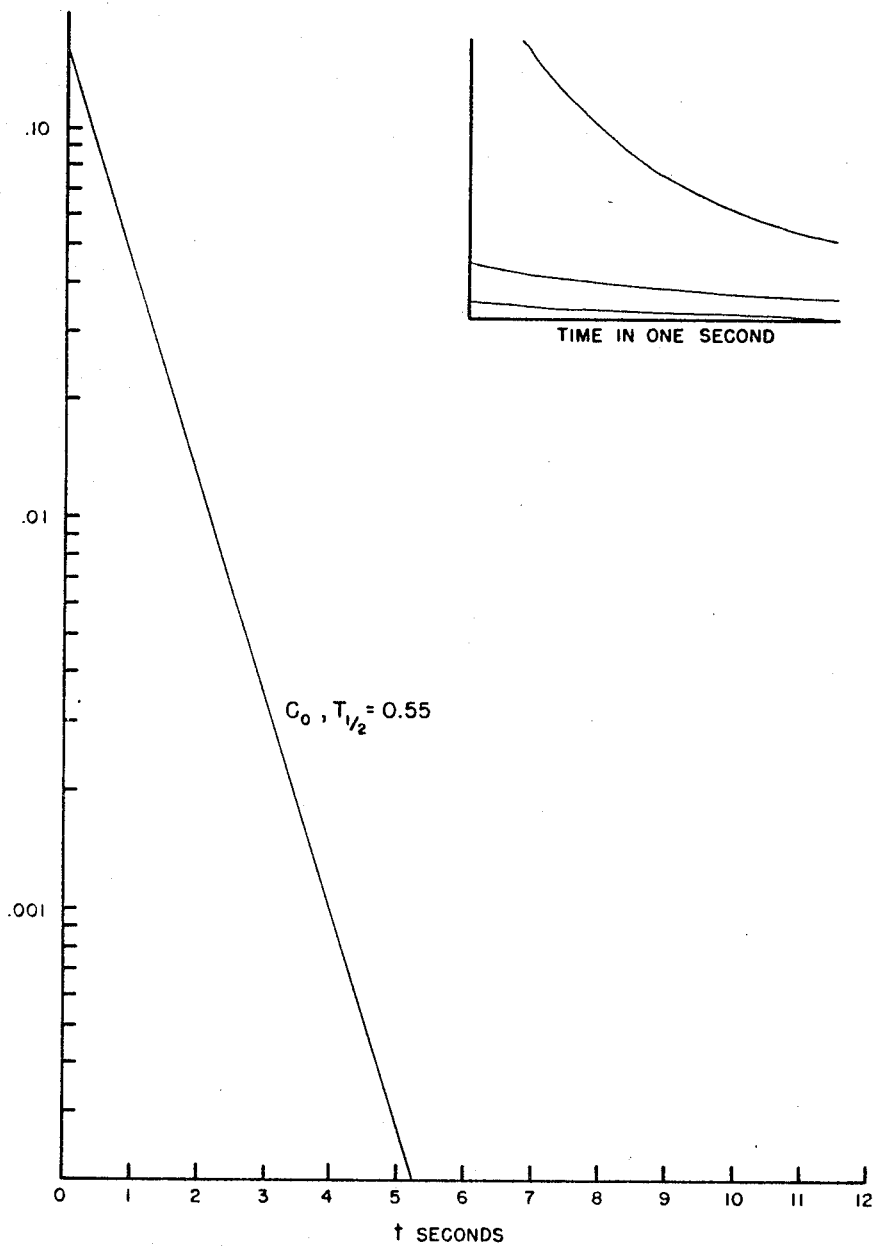

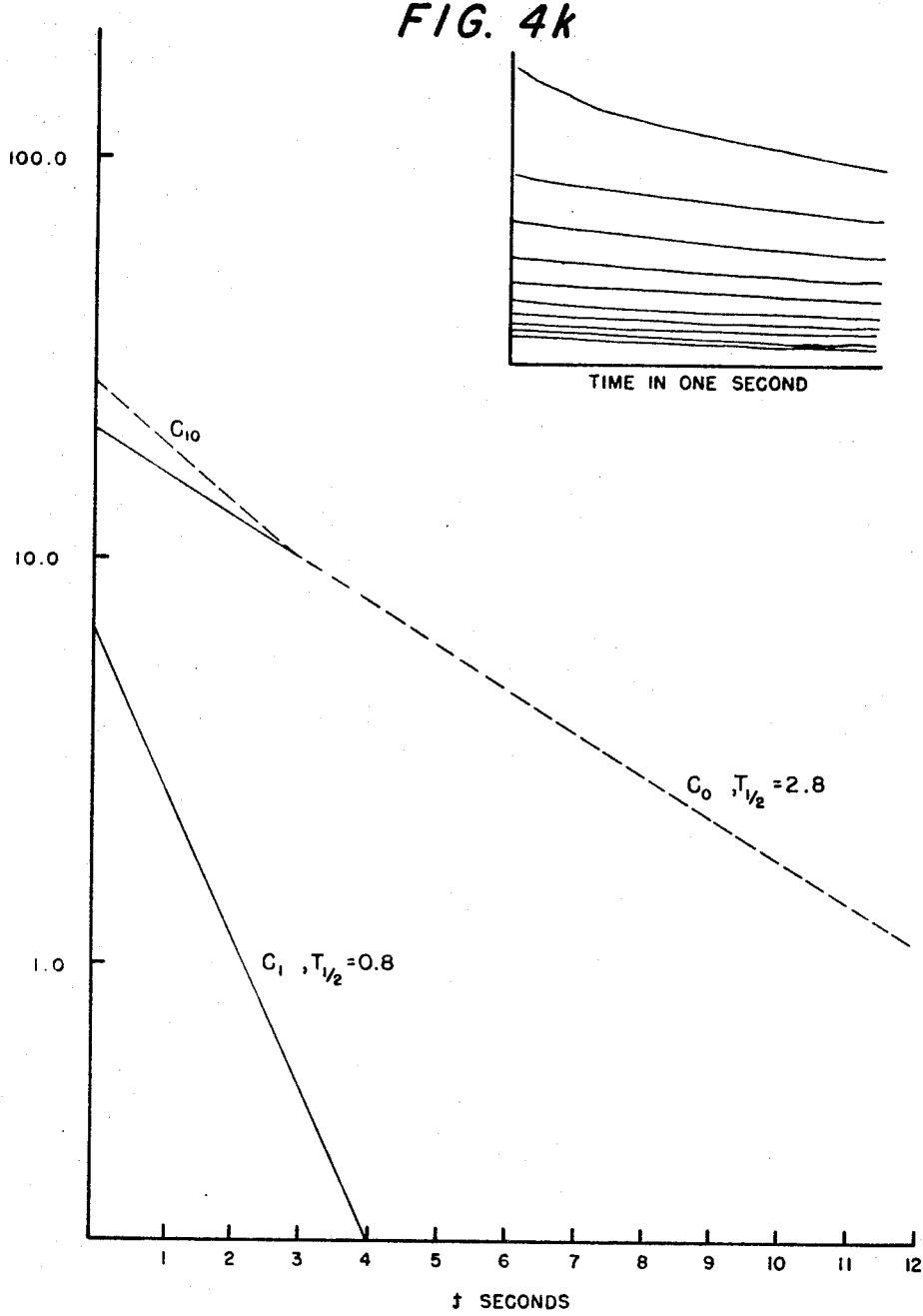

United States Patent Office 3,449,571
Patented June 10, 1969

3,449,571
METHOD OF DETECTING AND IDENTIFYING MICROORGANISMS AND OTHER BIOLOGIC MATERIALS
Kirk C. Hoerman, Potomac, Md., and Herschel C. Sudduth, Washington, D.C., assignors to the United States of America as represented by the Secretary of the Navy
Filed July 7, 1967, Ser. No. 651,957
Int. Cl. G01n 21/38, 23/08
U.S. Cl. 250—71                              2 Claims

ABSTRACT OF THE DISCLOSURE

This invention provides rapid accurate identification of the physical and chemical makeup of biological materials in condensed systems including microorganisms, based on the quantum aspects of luminescent domains within the solid structure submitted to radiant energy excitation. A sample of the material to be identified is placed in a special holder and cooled to about liquid nitrogen temperature. The sample is subjected to radiation of a desired and optimum wavelength. The radiation excites the atoms or molecules of the material to produce luminescense. The light emitted by luminescence is detected by a photomultiplier tube and the output of the photomultiplier tube either as intensity varying with wavelength or time after cessation of exciting energy is recorded as a trace on an oscilloscope or any other well known means. The trace or signature recorded is peculiar to that sample material or microorganism. Thus, different bacteria, e.g., cocci, bacilli or virii, etc., as well as certain proteins and various types of animal and plant cells, components and interfaces thereof in condensed systems may be identified.

---

Figure 1:
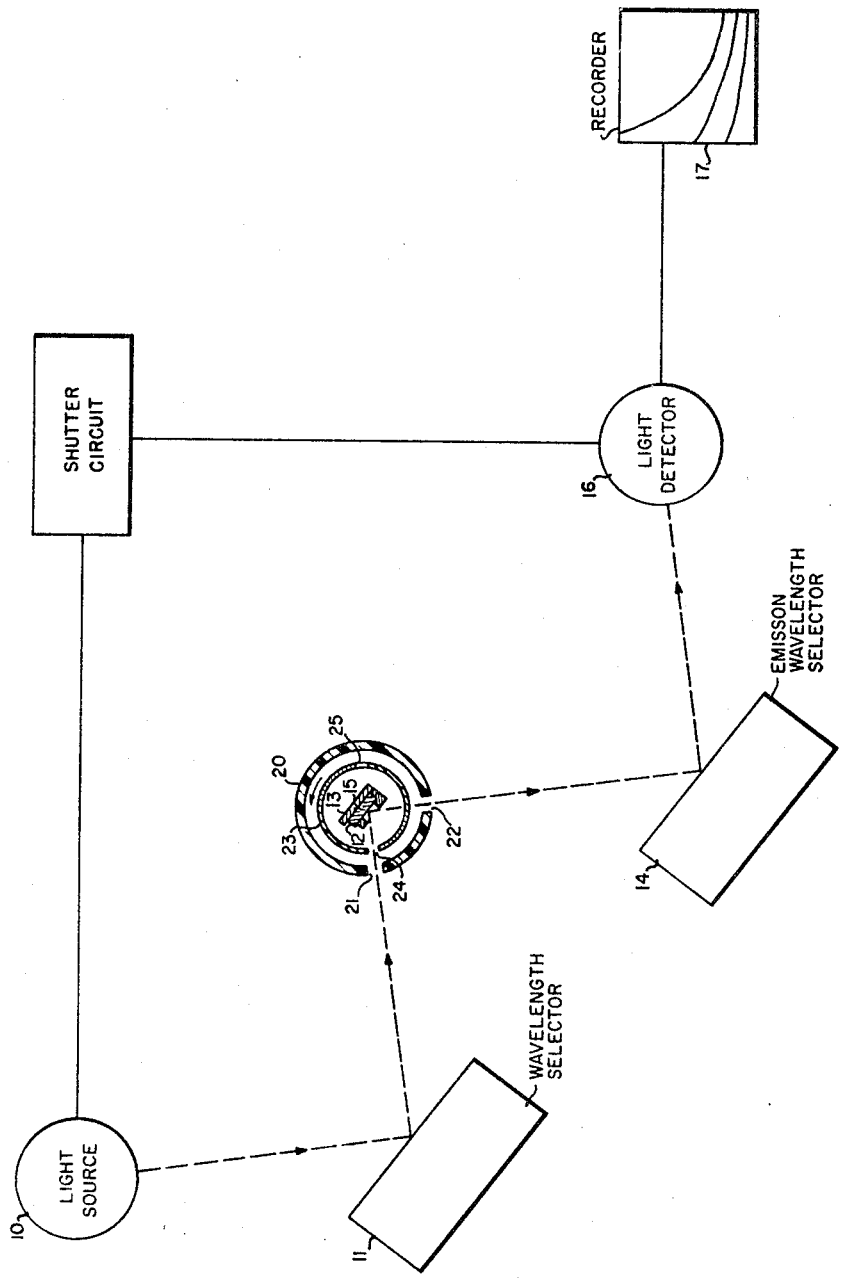

The invention described herein may be manufactured and used by or for the Government of the United States of America for governmental purposes without the payment of any royalties thereon or therefor.

This invention is directed to rapid medical diagnosis, of constitutional debilities and pathological identification of microbic diseases and more particularly to the apparatus and method for carrying out such identifications.

Heretofore low temperature phosphorescence of calcified tissue (bone, tooth dentin and enamel) and other biological materials in the solid state has been carried out in order to obtain excitation and emission spectra and in unaltered slices or pellets or dispersed and pressed into KBr pellets and placed in an spectrophotofluorometer in which the sample was cooled to a temperature about that of liquid nitrogen. The samples were exposed to ultraviolet light which caused phosphorescence in which the light emitted was detected by a phototube. The recorded output of the phototube was characteristic of the particular sample in which the excitation and emission maxima, spectra and relative intensities are reproducible. A more complete discussion of such prior work appears in an article "Phosphorescence of Calicified Tissues" by K. C. Hoerman and Sandra A. Mancewicz appearing in Archives of Oral Biology, vol. 9, pp. 517–534, 1964, Pergamon Press Ltd. Other research in luminescence has been carried out in studying rat skin collagen and its molecular subunits which has been reported in an article "Some Quantum Aspect of Collagen" by Kirk C. Hoerman and Aram Y. Balekjian in the May–June 1966 issue of Federation Proceedings, vol. 25, No. 3 pp. 1016–1021.

At the present time, methods and means for medical diagnosis and pathological identification or analyses of microbic diseases depend on the observation of chemical or biological interactions in which the subject organism or compounds take part to form at least a necessary part of the analytical procedure and which require anywhere from several hours to many months for a positive and/or reliable result to be established. This time span is obvious when prior art identification involves solvent extraction of molecular components with subsequent analysis by such physical methods as electrophoresis, column and/or gas chromatography. In the case of microorganisms, culturing for extended periods is required. Use of the quantum aspects of biological materials for identification and probing of structure has been carried out in solution (frozen) and has limitations in that universal solvents, especially of a nonaqueous form, are unknown. Other problems exist due to glass cracking and unsatisfactory results. Such prior art bacterial identification systems require elaborate, bulky, and immobile laboratory facilities.

The present invention reduces the procedure to one requiring only a few minutes at most for a reliable identification of bacteria and other biologic materials in which the procedure requires no chemical or biosynthetic techniques normally used prior to the present invention. The system used is relatively small, is mobile and easily stored when not in use.

Biological macromolecules generally spend their brief active metabolic existence in a system between infinite dilution and packed crystallographic unit cells. This may be called the condensed system. Generally, scientists have employed classic physicochemical methods applied to biological macromolecules either in a sea of buffer or in crystal unit cells. Such methods of analysis are pragmatic ones and encourage the advancement of conceptual models which may be far from the truth of circumstances of the molecule in its natural state.

The methods and instrumentation herein described make possible observations of the condensed, or natural state, of molecular domains within the biological system.

It is therefore an object of the present invention to provide a simple system for quick identification of bacteria, as well as certain proteins and various types of animal and plant cells and tissues.

Another object is to provide a method of identifying bacteria and or microorganisms without insertion of the test sample into a surrounding of liquid nitrogen.

Another object is to provide a system and method of identifying bacteria, etc., which may be carried out by semiskilled as well as skilled personnel.

Still another object is to identify bacteria, etc., by use of a relatively small piece of equipment which occupies a small space and which may be easily stored.

Yet another object is to provide a device for spectrophotometrically analyzing phosphorescent response of biological materials or microorganisms for identification purposes.

A further object is to provide a device for spectrophotometrically analyzing biological materials which does not require previous freezing of the sample.

The nature of this invention as well as other objects and advantages thereof will be readily apparent from consideration of the following specification relating to the annexed drawings, in which:

FIG. 1 is a schematic diagram illustrating the optical as well as other arrangements of the relative parts of the apparatus for carrying out the method, FIGS. 2a, 2b, 2c, and 2d illustrate curves of emission intensity versus emission wavelength for the following organisms; (2a) Bacillus subtilis; (2b) Staphylococcus epidermidis; (2c) Neisseria meningitides, strain 1027A; and (2d) Neisseria meningitides, strain L–1, as recorded from an oscilloscope.

FIGS. 3a, 3b, 3c, 3d, 3e, and 3f illustrate curves of emission intensity versus emission wavelength for cell walls and cell saps of three strains of *Neisseria meningitides*; 3(*a*) 1027A wall; 3(*b*) 1027A sap; 3(*c*) L–1 wall; 3(*d*) L–1 sap; 3(*e*) 2091B wall; 3(*f*) 2091B sap as recorded from an oscilloscope; and FIGS. 4*a*, 4*b*, 4*c*, 4*d*, 4*e*, 4*f*, 4*g*, 4*h*, 4*k* and 4*m* illustrate plots of the natural logarithm of emission intensity versus time for different organisms; 4(*a*) *Bacillus subtillis*, 4(*b*) *Staphylococcus epidermidis*; 4(*c*) *Neisseria meningitides* 1027A wall; 4(*d*) *Neisseria meningitides* L–1 wall; 4(*e*) *Neisseria meningitides* 2091B wall; 4(*f*) *Neisseria meningitides* 1027A sap; 4(*g*) *Neisseria meningitides* L–1 sap; 4(*h*) *Neisseria menginitides* 2091B sap; 4(*k*) *Neisseria meningitides* 1027A whole cell; 4(*m*) *Neisseria meningitides* L–1 whole cell. The inset (upper right) represents a photograph of a cathode ray screen tracing showing the exponential decay process.

The method employed in this invention takes advantage of a previously unutilized fact that microorganisms and many of their gross components, such as cell walls, emit fluorescent and phosphorescent radiation in a unique and characteristic manner when in undissolved form and exposed by electromagnetic radiation of appropriate wavelength. Luminescence due to the decay from excited states of atomic or molecular electrons by radiative emission, has been known to exist in complex organic systems, most generally dilute ones, in both the short lived (fluorescent) and long-lived (phosphorescent) varieties. It has been determined that under appropriate physical conditions luminescent radiation occurs in the structure of organisms or tissues in condensed systems and that the intensity of phosphorescent radiation, as well as the time required for this intensity to fall off to any set point such as ½ the total lifetime, may be compared with a catalog of such data and spectra of known microorganisms or components until a corresponding signature set is found. Since each microorganism or condensed system component has its own definite signature and spectra, matching the signature of an unknown sample to the signature of a known is parallel to that of matching finger prints, or the spectra of elements.

In order to obtain the signature of a microorganism, an Aminco-Bowman Spectrophotofluorometer manufactured by the American Instrument Co., Inc., Silver Spring, Md., was modified and a storage oscilloscope connected to the output. The oscilloscope is equipped with means for taking photographs of the signal for a permanent record. FIG. 1 illustrates diagrammatically the arrangement of the various elements of the device. As shown, a light source 10 directs light of a desired intensity onto an excitation wavelength selector 11 such as a diffraction grating monochromator which directs a monochromatic light beam onto a sample 12 which is held in a temperature controlled specimen holder 13. The light incident on a specimen secured within the speciment holder causes the specimen to luminesce. The light emitted by the specimen is directed onto an emission wavelength selector 14 such as a diffraction grating monochromator which directs a specific wavelength of light onto a light detector 16 such as a photomultiplier tube sensitive to the emitted light range. The output of the photomultiplier is then directed to a recorder, an oscilloscope, a computer or any other means 17 for indicating the emission signature of the sample. A housing 20 surrounds the specimen and light is admitted to the specimen through a slit 21 and emerges through a slit 22 spaced 90 degrees from slit 21. In order to control the light, a shutter 23 having slits 24 and 25 therein 180 degrees apart is rotated about the specimen. In obtaining a signature of the specimen, the specimen is maintained at liquid nitrogen temperature which requires a suitable liquid nitrogen reservoir in combination with the specimen holder. The reservoir is provided with a control means to insure that the liquid nitrogen does not go below a desired level. A suitable specimen holder, slits through which light passes, and a rotating shutter are adequately described and shown in Patent No. 3,264,474. It is to be specifically noted that the specimen holder is arranged such that a cold finger extends into the liquid nitrogen and the sample is positioned above the reservoir such that incident light on the specimen is direct and does not pass through glass or any other elements.

In normal operation of the system for spectral analysis of a sample, the equipment must be calibrated to obtain maximum excitation and emission light. Thus, liquid nitrogen is added to the reservoir and the sample is placed within the specimen holder which has a cold finger that extends into the liquid nitrogen. The specimen is permitted to reach its lowest temperature, about 89° K., and the excitation monochromator is set at 200 m$\mu$ without the use of the rotating shutter. The emission monochromator is then set at a wavelength of 438 m$\mu$, which is the phosphorescent emission maximum for tryptophan (an indole nucleus emitter), an amino acid which is responsible for the luminescence of most biologic materials. While this emission setting is held constant, the excitation monochromator is carefully advanced at 2 m$\mu$ intervals from 200 m$\mu$ and up until a point on the excitation scale is found at which intensity of the 438 m$\mu$ emission is at maximum. This point, or wavelength of light, is the excitation maximum and usually is found between 275 and 290 m$\mu$ for biological macromolecules such as proteins or intact microbial cells in condensed systems as described herein. The specimen is then continuously excited at its maximum wavelength, i.e. 285 m$\mu$, then the emission monochromator is set at 200 m$\mu$. A systematic advancement of the emission monochromator is commenced and a total emission spectrum is recorded, FIG. 2 line A, which is composed of, from left to right, the first order scatter *s* of light from the condensed surface of the specimen, then the low temperature fluorescence peak *f* and curve, followed by the less intense phosphorescent peak *p* and spectrum. The final portion of the line is the second order or harmonic scatter peak *hs*. The wavelengths at which peak intensity of fluorescent and phosphorescent emission occur are recorded as part of the signature of the specimen. Then the areas under the two emission curves (fluorescent and phosphorescent) are integrated and the fluorescence to phosphorescence ratio is computed. This value is uniquely characteristic of the specimen since it indicates the degree of intersystem crossover from the singlet (fluorescent) to triplet (phosphorescent) states of electron excitation. This value is also added to the signature mosaic. FIGS. 2*a*, *b*, *c* and *d* represent actual photographs as recorded from an oscilloscope therefore the peaks for the first order scatter *s* and harmonic scatter peak *hs* are not shown. A rotating shutter which has two slits at 180° apart is placed within the cylindrical sample compartment and over the specimen. The shutter is then rotated on its motor shaft at a speed of 8,000 r.p.m. and thereby mechanically eliminates all short-lived processes, such as fluorescence and scattered light (less than $10^{-8}$ seconds), and permits only longer-lived light processes, such as phosphorescence, to be "seen" by the emission monochromator and photomultiplier. The excitation monochromator is again set at 200 m$\mu$ and advanced incrementally while the emission monochromator is set at the phosphorescent emission maximum (438 m$\mu$ unless the total emission experiment caused a change). The excitation wavelength at which peak intensity at 438 m$\mu$ emission setting occurred was taken as the excitation maximum. This value is invariably the same as the excitation maximum obtained for the total emission experiment—that is, unless there is more than one luminescent center. An emission spectrum is then obtained with the excitation at maximum wavelength as shown in FIG. 2, line B. The relative intensities of the three phosphorescent emission peaks in this spectrum were recorded and became a portion of the signature vector of the biologic material. Once a signature of the unknown sample has been obtained the signature is matched with known signatures until a match is found which then identifies the unknown.

It has been determined heretofore that fluorescence occurs only during the first $10^{-8}$ seconds after cessation of excitation and that phosphorescence persists over a relatively long period of time provided the test sample has been brought to about liquid nitrogen temperature. Thus, the equipment may be operated such that only the phosphorescent state is recorded if desirable. Therefore after the equipment has been calibrated for maximum intensities as set forth above, the light decay parameter of the signature of an unknown sample is obtained as follows:

The double slotted rotating shutter is replaced by a shutter having a single slot. The slot in the shutter is rotated in alignment with the excitation slot in the specimen holder and the sample specimen is irradiated with the excitation radiation. Since the shutter has only one slot, the detector is blocked optically from the specimen. The excitation of the specimen is stopped, at the same time, the dark current base of the phototube is set at an arbitrary zero and the time trace is set at zero along the X-axis of the storage oscilloscope. Upon setting the current base of the phototube and the time trace of the oscilloscope, the single slot shutter is rotated by hand in alignment with the exit slot in the specimen holder, thus, optically opening the excited specimen to the detector. The light emitted by the specimen due to phosphorescence is then incident on the detector and the trace of declining intensity appears on the oscilloscope. Since the shutter has only one slot therein which is in alignment with the slot in the specimen holder and the detector, no stray light is incident on the detector. Therefore, only that light which is emitted by the specimen reaches the detector. Since the oscilloscope is of the storage type the trace comprising part of the total signature of the specimen may be photographed and compared with a bank of known light decay signatures. By use of a shutter with a single slit therein as set forth above, a single datum of only the phosphorescence for each different specimen may be obtained.

Since observation of the phosphorescence decay is restricted to a particular emission wavelength, then for an array of electrons in the structure, the physical origins of which will, in general, be different, the total intensity of radiation at a given time, $t$, will be expressed by a function of the form $$P_T = P_0 e^{-a_0 t} + P_1 e^{-a_1 t} + \ldots P_n e^{-a_n t} \equiv \sum_i P_i e^{-a_i t}$$

paths or parent-daughter relationships between adjacent states if no restrictions are placed on the coefficients.

In proving the feasibility of the instrumentation to differentiate between different biological samples five bacterial strains were prepared to obtain known spectral signatures and then tested by use of unknown samples. The five strains used are (1) Bacillus subtilis, (2) Staphylococcus epidermidis, (3) Neisseria meningitides Group A (strain 1027A), (4) Neisseria meningitides Group B (strain L-1), and (5) Neisseria meningitides substituents.

All the samples were grown in modified Franz medium for 20 to 22 hours at 37° C. After this growth period the collected cultures were washed five times in a solution of 0.15 molar sodium chloride and then were collected by centrifugation. The Bacillus subtilis and Staphylococcus epidermidis were studied both as living organisms and autoclaved whole cells, while the Neisseria cultures were killed by 1% β-propriolactone in which they were placed for two hours at room temperature, followed by about twenty-four hours at 0 to 4° C.

In addition to the study of washed whole cell structures from each sample, preparations of the Neisseria strains were morphologically disrupted by the use of multiple freeze-thaw cycles maintained at pH 7.0. The freed cell walls were cleaned by washing in saline solution, phosphate-buffered saline, and finally distilled water. The cell sap, on the other hand, was filtered through a membrane filter with a pore size of 0.45μ. The protein content of the cell wall suspensions and the cell sap was determined by the Lowry method and adjusted to uniform values before the analysis was begun.

Figure 3A:
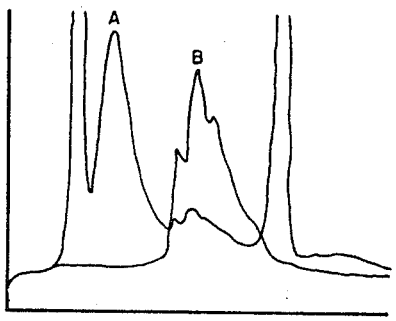
Figure 3B:
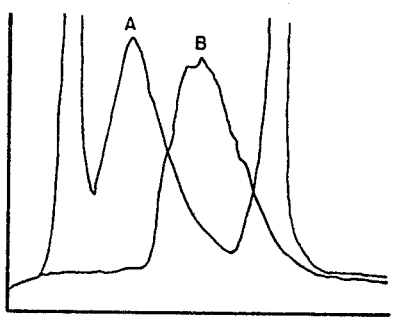
Figure 3C:
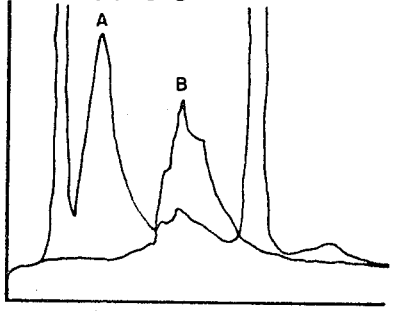
Figure 3D:
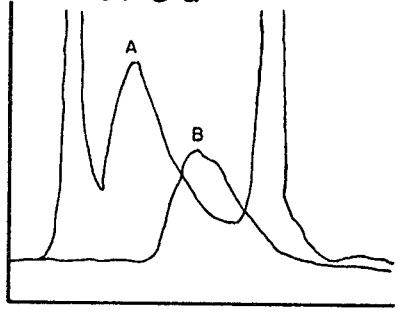
Figure 3E:
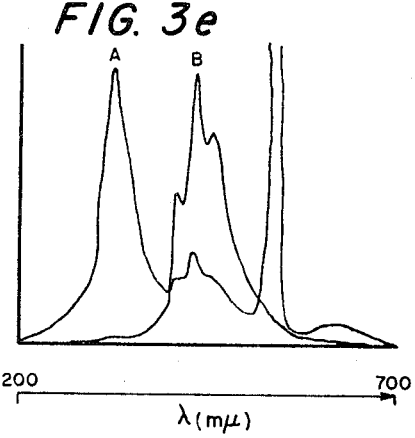
Figure 3F:
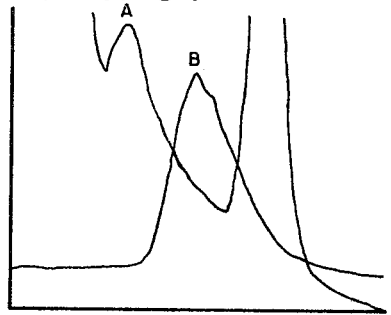

FIGS. 2a, b, c and d show the total emission spectra for different whole cell samples and FIGS. 3a, b, c, d, e, and f show the emission spectra for separated walls and saps in samples of Neisseria. In all cases the x-scale is linear from 200 mμ to 700 mμ. The curve, A, with multiple peaks is the total spectrum with the shutter removed. The first peak $s$ is elastic scatter of exciting radiation, the second peak $f$ is fluorescence, the third $p$ is phosphorescence. The superimposed second curve, B, shows the phosphorescent emission bands alone obtained by using the shutter to exclude scatter and fluorescent emission.

Table I lists for each sample the excitation wavelength for the total emission and phosphorescent curves, the wavelength corresponding to the point of maximum fluorescence ($x_f$), the wavelength corresponding to the point of maximum phosphorescence ($x_p$) and the ratio of the maximum fluorescent intensity to the maximum phosphorescent intensity ($F/P$ ratio). The spectra and maxima presented are not corrected for variation in photomultiplier sensitivity with respect to wavelength.

TABLE I.—EXCITATION AND EMISSION WAVELENGTHS CORRESPONDING TO F/P AND PHOSPHORESCENT MAXIMA AND VALUES OF F/P RATIOS

| | Excitation (λ)[1] | | Emission (λ)[1] | | | | | | |
|---|---|---|---|---|---|---|---|---|---|
| | | | | | $P_{max.}$ (mμ) | | | | |
| Samples at 89° K. | F/P (mμ) | P (mμ) | $F_{max.}$ (mμ) | $x_{p_1}$ | $x_{p_2}$ | $x_{p_3}$ | $x_{p_4}$ | $k_{x_p}$ | F/P |
| Whole Cells: | | | | | | | | | |
| 2a. B. subtilis | 270 | 286 | 330 | ~395 | 412 | 438 | 465 | 0.56 | 3.66 |
| 2b. S. epidermidis | 270 | 300 | 335 | | 412 | 438 | 460 | 0.99 | 2.65 |
| 2c. N. meningitides 1027A | 270 | 289 | 325 | ~395 | 412 | 440 | 470 | 1.59 | 4.52 |
| 2d. N. meningitides L-1 | 270 | 290 | 335 | ~395 | 412 | 438 | 465 | 1.33 | 5.09 |
| N. meningitides Substituents: | | | | | | | | | |
| 3a. 1027A wall [2] | 270 | 289 | 334 | ~395 | 420 | 447 | 470 | 1.09 | 5.00 |
| 3b. 1027A sap | 270 | 308 | 355 | | | 445 | | | 32.0 |
| 3c. L-1 wall | 270 | 290 | 325 | ~395 | 410 | 434 | 460 | 1.64 | 4.88 |
| 3d. L-1 sap | 270 | 310 | 356 | | | 436 | | | 27.8 |
| 3e. 2091B wall | 270 | 290 | 325 | ~395 | 410 | 435 | 455 | 1.94 | 4.02 |
| 3f. 2091B sap | 270 | 310 | 360 | | | 447 | | | 38.0 |

[1] Uncorrected for variation of photomultiplier sensitivity with respect to changing.
[2] Red shifted by 10 mμ due to uncorrected monochromator.

Where $P_T$ is the total intensity of the emitted radiation as phosphorescence and where $a$ is the decay rate constant characteristic of each excited state present in the organism or biologic macromolecule. The form of the above function is valid irrespective of alternative decay FIGS. 4a, 4b, 4c, 4d, 4e, 4f, 4g, 4h, 4k, and 4m illustrate the phosphorescent decay curves for each sample plotted on a semilogarithmic scale. The dotted line envelope is the over-all decay curve, the solid lines show the individual components outlined by piecewise subtraction.

Alongside each component is inscribed its half-life, defined by the time required for the population of the state concerned to decrease to one-half its initial value. It can be shown that by this definition $$T_{1/2} = \frac{\ln 2}{a_i}$$

Where $a_i$ is the decay constant.

TABLE II.—PHOSPHORESCENT DECAY CONSTANTS OF SAMPLES AT 89° K.

| | Organism | | | | | | | |
|---|---|---|---|---|---|---|---|---|
| | B. subtilis | S. epidermidis | N. meningitides | | | | | |
| | | | Substituent | | | | | |
| | | | Cell Wall | | Cell Sap | | Whole Cell | |
| | | | Group | | | | | |
| | Whole Cell | Whole Cell | A | B | A | B | A | B |
| | | | Strain | | | | | |
| | | | 1027A | L-1 | 2091B | 1027A | L-1 | 2091B | 1027A | 2091B |
| $a_0$ | 0.097 | 0.269 | 0.277 | 0.257 | 0.266 | 0.42 | 1.260 | 0.272 | 0.239 | 0.248 |
| $T_0 P \times 10^{-3}$ | 71.24 | 25.69 | 24.95 | 26.89 | 25.97 | 16.45 | 5.48 | 25.39 | 28.90 | 27.85 |
| $a_1$ | 0.385 | 0.693 | 1.595 | 1.155 | 1.260 | 1.540 | | 1.260 | 0.533 | 0.866 |
| $T_1 P \times 10^{-3}$ | 17.95 | 9.97 | 4.33 | 5.98 | 5.48 | 4.49 | | 5.48 | 12.96 | 7.98 |
| $a_2$ | 0.578 | 1.386 | | | | | | | 1.066 | |
| $T_2 P \times 10^{-3}$ | 11.95 | 4.98 | | | | | | | 6.48 | |
| $a_3$ | 1.98 | | | | | | | | | |
| $T_3 P \times 10^{-3}$ | 3.49 | | | | | | | | | |

Table II lists the values of $a_i$ for each component and each sample as well as the quantity $T_P \times 10^{-3}$ defined by $$T_i P \times 10^{-3} = \frac{\ln 1000}{a_i}$$

The analysis of total emission and phosphorescent spectra of the four microorganisms and their substituents is highly reproducible from preparation to preparation in single organisms, and also shows distinguishing marks of emitting domains from one organism to another. The relative coincidence of the overall phosphorescent emission curves was obtained by calculation of a constant $k_{x_p}$: given by $$k_{x_p} = \frac{x_p 3 - x_p 2}{x_p 3 - x_p 4} \quad \text{(see Fig 2a)}$$

The $x_p$ values for cell saps of all strains of *Neisseria meningitides* were uniformly located at 445 m$\mu$ and appeared to be singly occurring although one might claim some indication of a shoulder at 410 m$\mu$. This weak phosphorescent emission occurred after excitation at 310 m$\mu$. It may be noted in FIGS. 3b, 3d, and 3f that the width of the $x_p$ emission bands was very great (~225 m$\mu$). This was verified by the presence of a relatively short-lived decay process associated with the major luminescent center. An excitation maximum at 310 m$\mu$ for cell sap whose $x_p=445$ m$\mu$, is uncommon, and as far as can be determined, has not been shown typical of protein associated centers. Thus, structural nature of this luminescent center in *Neisseria meningitides* remains obscure.

Attention is now directed to FIG. 2 and the emission spectra of whole cells of *Bacillus subtilis* (FIG. 2a), *Staphylococcus epidermidis* (FIG. 2b), *Neisseria meningitides* (1027–A) (FIG. 2c) and *Neisseria meningitides* (L–1) (FIG. 2d). It is immediately apparent that the general form of the total and phosphorescent emission curves are different, if not indeed unique, from one species or strain to another. The reasons for changes in specific shape of phosphorescent emission curves among intact microorganisms is not understood; however, it is entirely possible that cellular substituents, such as cell sap which has its excitation maxima at 310 m$\mu$, might reabsorb fluorescent radiation of the prime luminescent center ($x_f$=~325 m$\mu$) and dissipate this energy in a characteristic fashion simultaneously with other discrete centers, thus presenting a total emission curve as an expression of the sum of all available processes concerned.

It will be seen from the decay curves (FIG. 4a–m) that the samples studied differ both in the number of exponential terms required to produce the function, $P_T$, and in the decay constants, $a_i$, associated with each term.

Figure 4A:
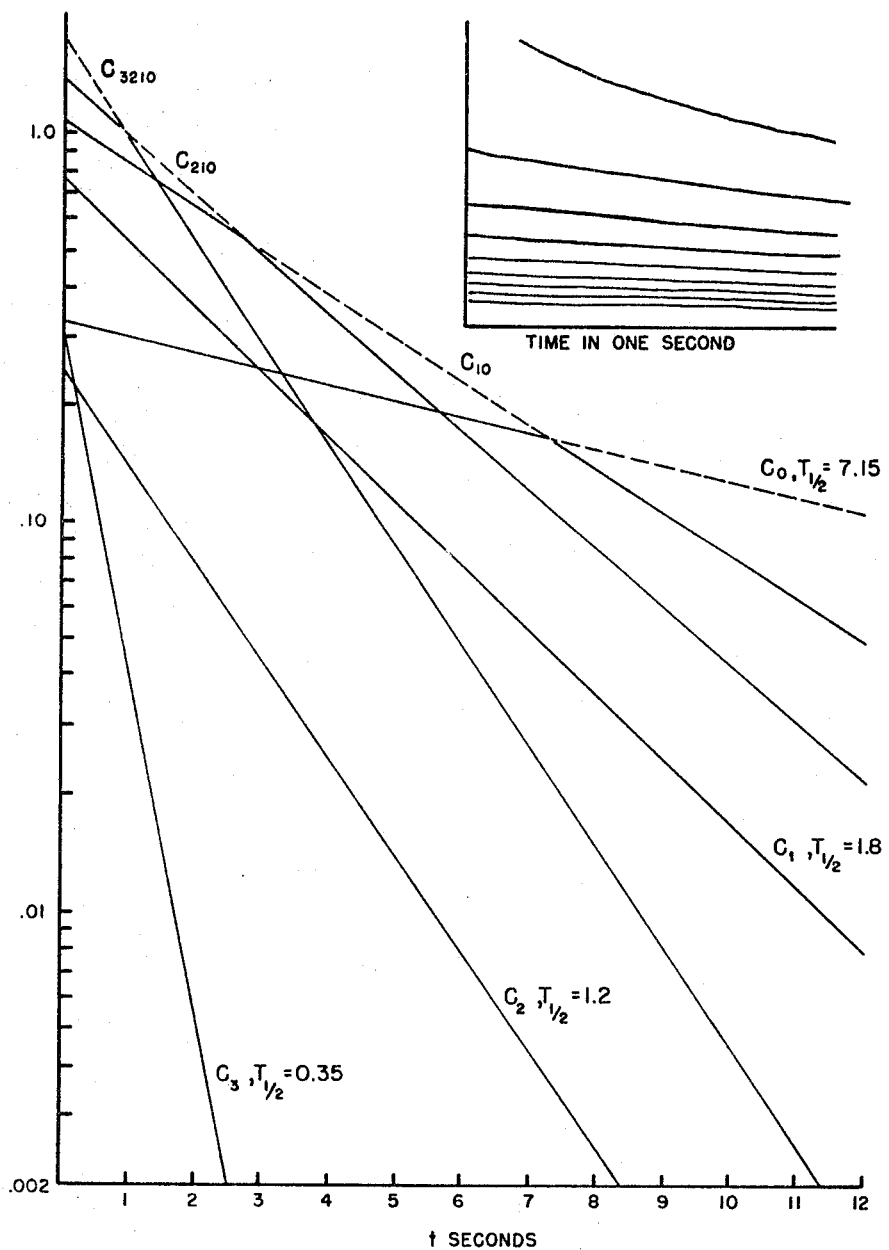
Figure 4B:
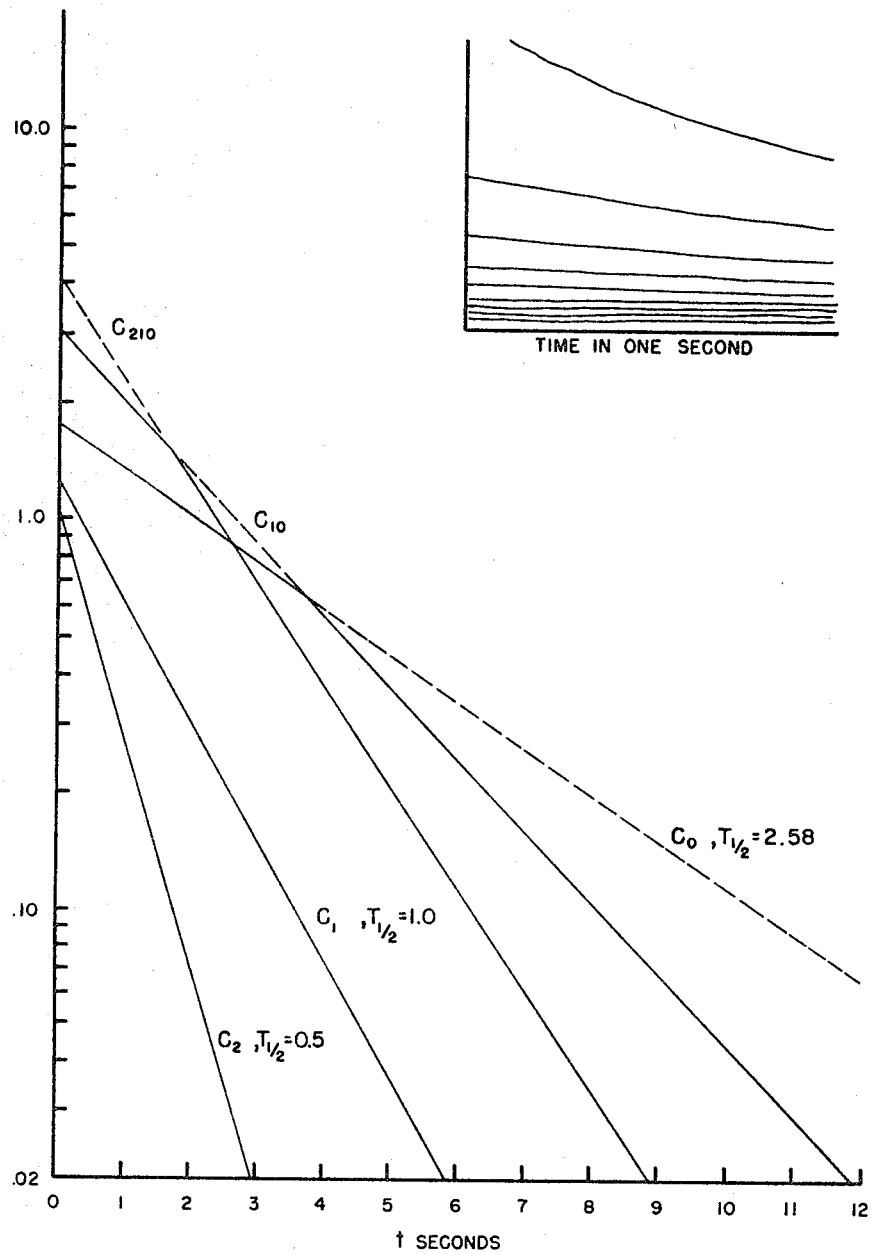
Figure 4D:
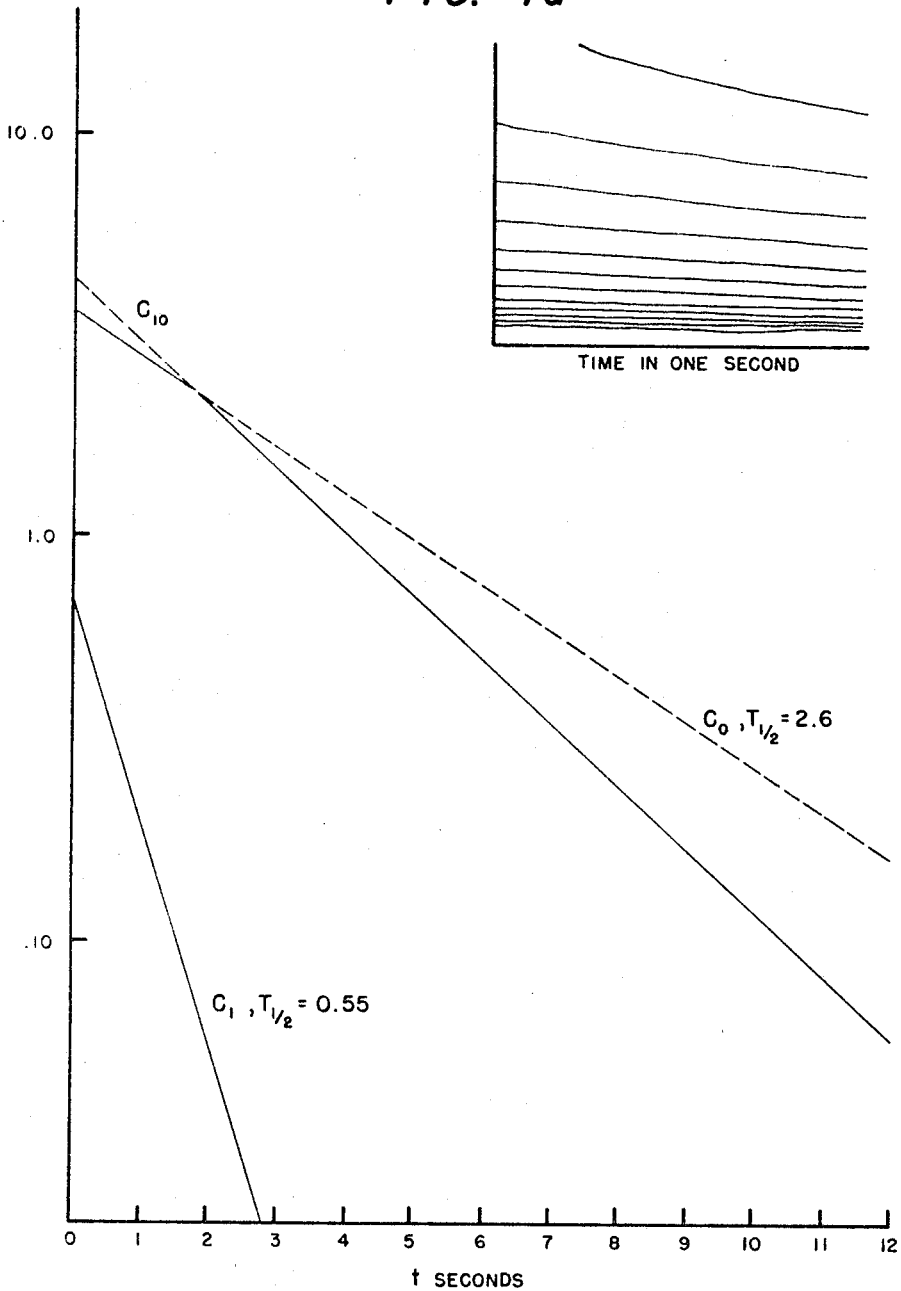
Figure 4E:
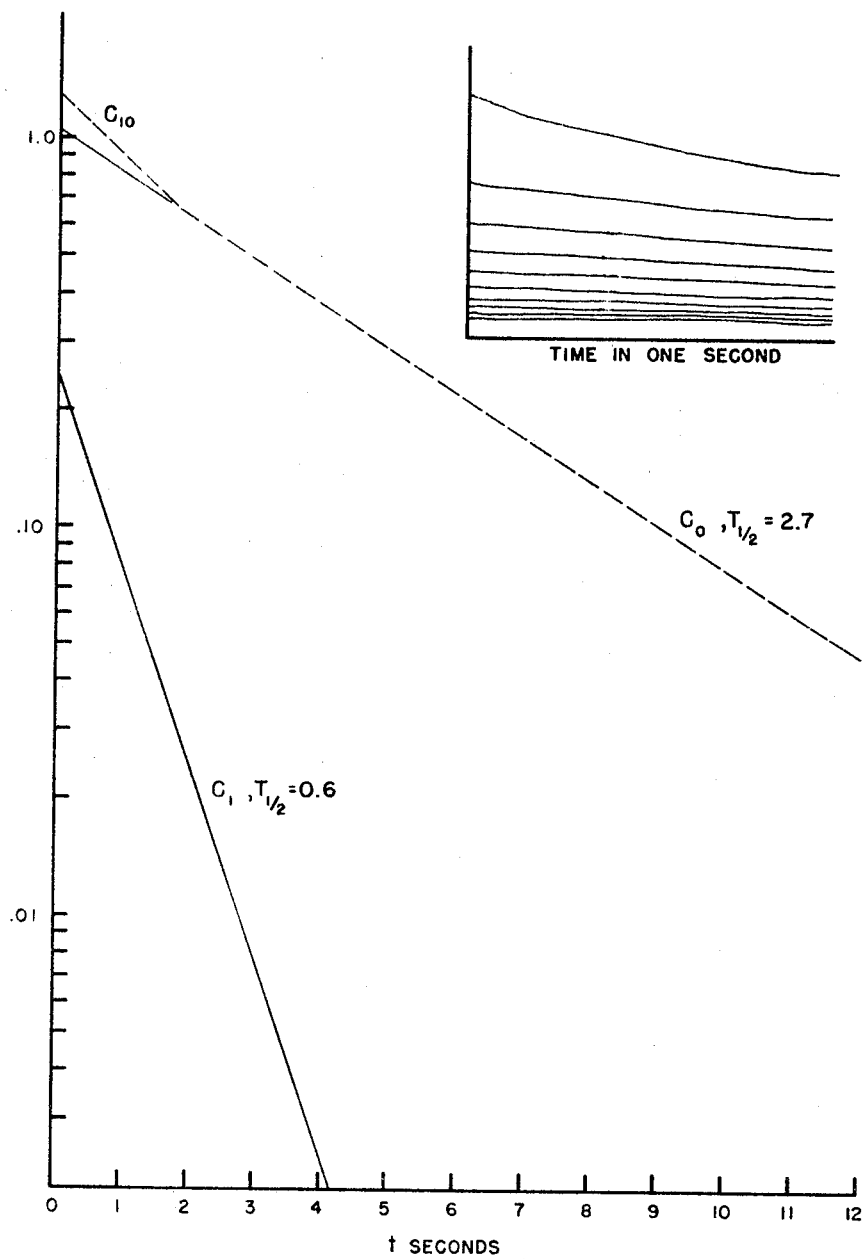
Figure 4F:
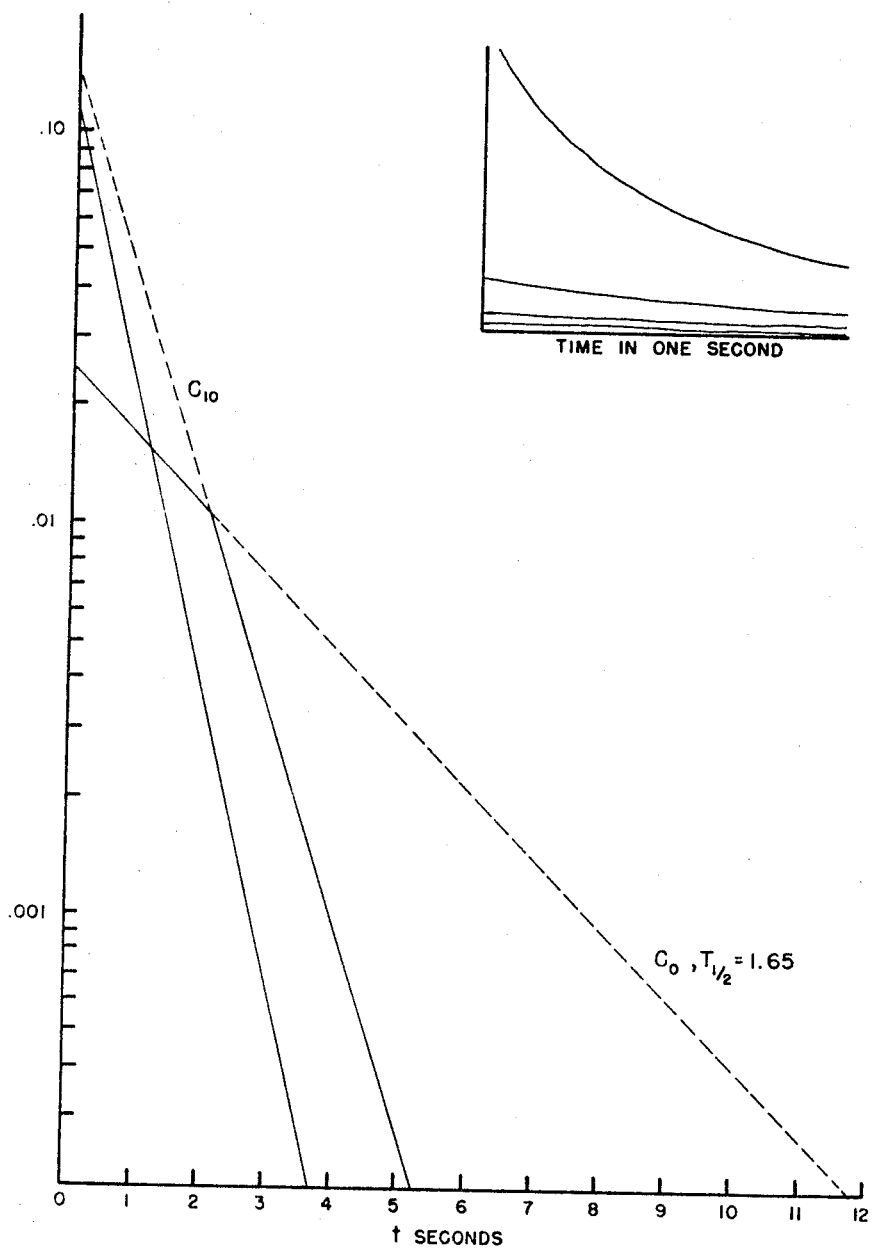
Figure 4H:
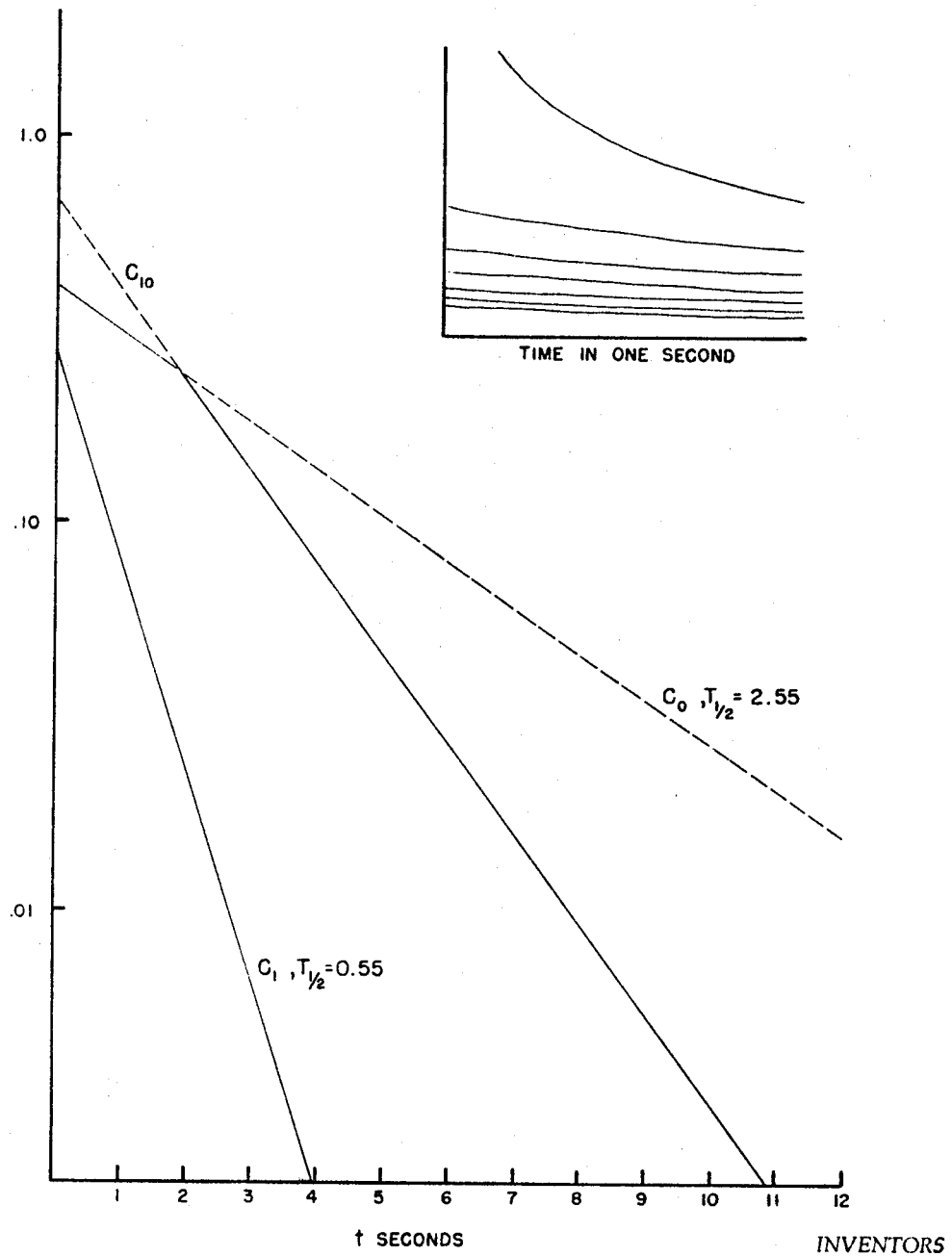
Figure 4M:
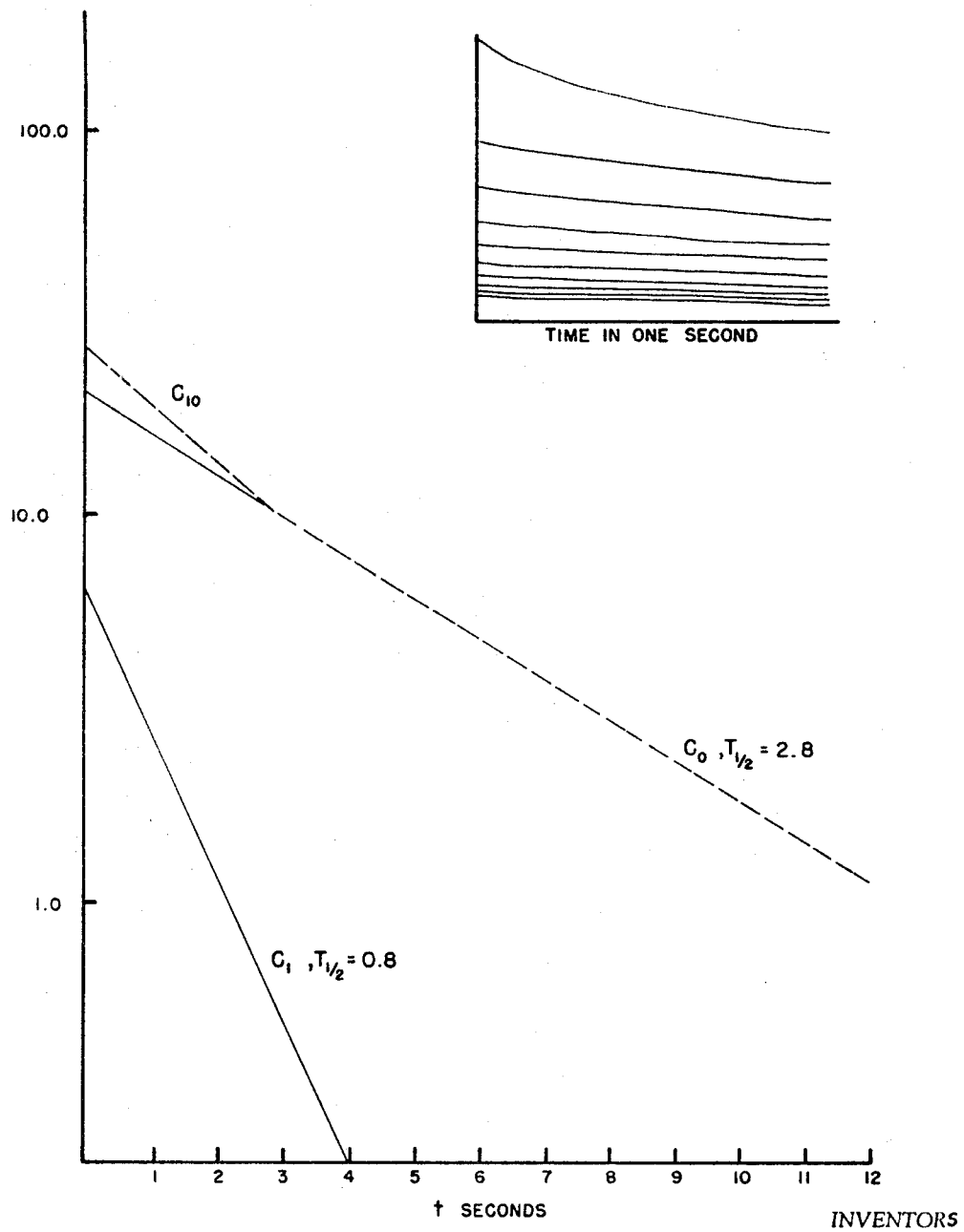

FIGS. 4a and 4b show the decay curves of *Bacillus subtilis* and *Staphylococcus epidermidis* respectively. These functions have been found to be characteristic of these two organisms, indeed constant, in a manner independent of whether these organisms were alive or steam autoclaved as well as independent of culture medium, preparation technique and concentration. It has been possible as a result, to pick out samples of each of them blindly from a control batch. A salient feature of the two curves is the four component nature of the *Bacillus subtilis* decay and the three component character of the *Staphylococcus epidermidis*. In addition, it can be seen that the components have significantly different decay constants associated with them (Table 2).

Thus, because of the nature of the function, $P_T$, it is possible to form a vector of the individual coefficients and decay constants of the form $$S \equiv \{a_0, a_1, \ldots a_n, P_0, P_1, \ldots P_n,$$
$$X_{f_1}, X_{p_1}, P_{f\,max.}, P_{p\,max.}\}$$

such that $$\sum_i P_i e^{-a_i t} \equiv P_T$$

and $$_iP_i \equiv 1$$

and where $x_f$ and $x_p$ are the wavelengths in the total emission spectra corresponding to maximum fluorescent and phosphorescent intensity respectively and $P_f$ and $P_p$ are those maximum intensities. It is recognized that the terms $F_{f\,max}$ and $P_{p\,max}$ are concentration dependent and as such, under the present methods, will not be constants. It is clear, however, that these components may be used in calculation of quantities such as $F/P$ ratios and the constant $K_{x_p}$ described above, which are, in fact, independent of the variable parameters of the analysis.

The material presented here show that the molecular domains in condensed systems of biological materials, dissipate adsorbed energy in a unique fashion which is characterized by (1) distortions of the emission spectra for fluorescence and phosphorescence, (2) lowered $F/P$ ratio, that is to say, increased electrons crossover from the singlet to triplet excited states and (3) development of multicomponent exponentials in the process of decay of phosphorescence after cessation of exciting light as opposed to the situation in solution of similar biologic material where only one component exists.

The unique qualities occur in condensed systems containing tryptophan residues in protein polypeptide chains (this is the case of bacterial cell walls and most likely intact cells) because, apparently, the physical origins of excited electrons of the luminescent center arise from different sites, where in dilute solutions (frozen) these origins of excited electrons are most likely one in number.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A method of identifying intact and condensed systems of biological material including bacteria, which comprises:

obtaining a sample of an unknown biological material sample, positioning said unknown sample onto a sample holder relative to a coolant chamber in a detection system including an excitation light source that produces an emission light, permitting said sample to reach a stablized cold temperature below 100 degrees Kelvin, maintaining said sample at said stablized cold temperature, calibrating said detection system to obtain maximum excitation and emission light, placing a single slot shutter around said sample, rotating said shutter to a position to admit monochromatic light to excite said sample while blocking light emitted by said sample, discontinuing excitation of said sample, rotating said shutter to permit excited light from said sample to become incident on an emission diffraction grating monochromator, directing light from said monochromator onto a light measuring device, directing the output of said light measuring device onto a recorder that records a signature of the light emission from said excited sample, and comparing the recorded signature of said unknown biological material sample with that of a known signature to identify the bacteria.

2. An apparatus for identifying solid specimens of biological materials and organisms, which comprises:

A source of light suitable for producing luminescence in samples of biological materials, an adjustable wavelength selector for selecting a desired wavelength of incident light from said light source, a specimen holder, said specimen holder accommodating solid or condensed systems free of light interferences and having an entrance slot therein for passage of said desired light and an exit slot for passage of light emitted by a specimen held in said specimen holder, a second adjustable wavelength selector for selecting a desired wavelength from light emitted by said specimen subsequent to being irradiated by said light from said desired light source, a light detector means in optical alignment with said second wavelength selector for detecting light emitted by said specimen and selected by said second wavelength selector, said light detector means producing an electrical output comparable to said light incident on said light detector means, a recorder means, said recorder means receiving said electrical output from said light detector means and recording a signature of said output signal, a shutter means operative for movement about said specimen holder, said shutter means including a single vertical slit therein for admitting light from said source to said specimen when said slit is in alignment with said entrance slot within said specimen holder while blocking emergence of light through said exit slot and subsequently on rotation permitting emergence of light through said exit slot when said slot in said shutter is in alignment with said exit slot while blocking light from said light source to said specimen, a reservoir for containing a liquid gas, a cold finger connected to said specimen holder for cooling said specimen held in said specimen holder upon insertion of said cold finger into said reservoir filled with a liquid gas, and means for controlling the liquid level of a liquid gas contained within said reservoir to maintain a temperature below 100 degrees Kelvin about said cold finger.

References Cited

UNITED STATES PATENTS

| 2,971,429 | 2/1961 | Howerton. | |
| 3,092,722 | 6/1963 | Howerton | 250—77 |
| 3,264,474 | 8/1966 | Heiss | 250—71 |

OTHER REFERENCES

Phosphorescence of Calcified Tissue by Hoerman & Mancewicz; Archives of Oral Biology, vol. 9, pp. 517–534 (1964).

Some Quantum Aspects of Collagen by Hoerman & Balekjian; Federation Proceedings, vol. 25, No. 3, May–June 1966.

Differential Identification of Microorganism by Analysis of Phosphorescent Decay by S. L. Adelman, A. K. Brewer, K. C. Hoerman and W. Sanborn; Nature, Feb. 18, 1968, pp. 718–720.

RALPH G. NILSON, *Primary Examiner.*

A. B. CROFT, *Assistant Examiner.*

U.S. Cl. X.R

250—71.5, 77, 105